United States Patent [19]

Copley

[11] Patent Number: 4,745,736
[45] Date of Patent: May 24, 1988

[54] IMPLEMENT TINES
[75] Inventor: Viryle L. Copley, Zumbrota, Minn.
[73] Assignee: Carol W. Brekken, Zumbrota, Minn.; a part interest
[21] Appl. No.: 91,033
[22] Filed: Aug. 31, 1987
[51] Int. Cl.⁴ .............................................. A01D 80/02
[52] U.S. Cl. .......................................... 56/400; 56/364
[58] Field of Search .................. 56/364, 400, 400.21; 172/96, 142, 643, 705, 707, 708

[56] References Cited

U.S. PATENT DOCUMENTS

| 3,065,591 | 11/1962 | Gustafson | 56/400 |
| 3,253,394 | 5/1966 | Johnston et al. | 56/400 |
| 4,473,994 | 10/1984 | Hein | 56/400 |
| 4,481,758 | 11/1984 | Fishbaugh | 56/400 |

FOREIGN PATENT DOCUMENTS 1240696  5/1967  Fed. Rep. of Germany ........ 56/400

Primary Examiner—John Weiss
Attorney, Agent, or Firm—Jacobson and Johnson

[57] ABSTRACT

An implement tine for attachment to an implement crossbar having a bracket for mounting to an implement crossbar, with the bracket having a web for engaging an implement tooth and the implement tooth having a hook located on one end to extend around the web in the bracket to provide a mechanical connection between the bracket and tooth with a resilient mount encompassing the mechanical connection of the tooth and the bracket to provide a resilient implement tine.

7 Claims, 1 Drawing Sheet

U.S. Patent May 24, 1988 4,745,736
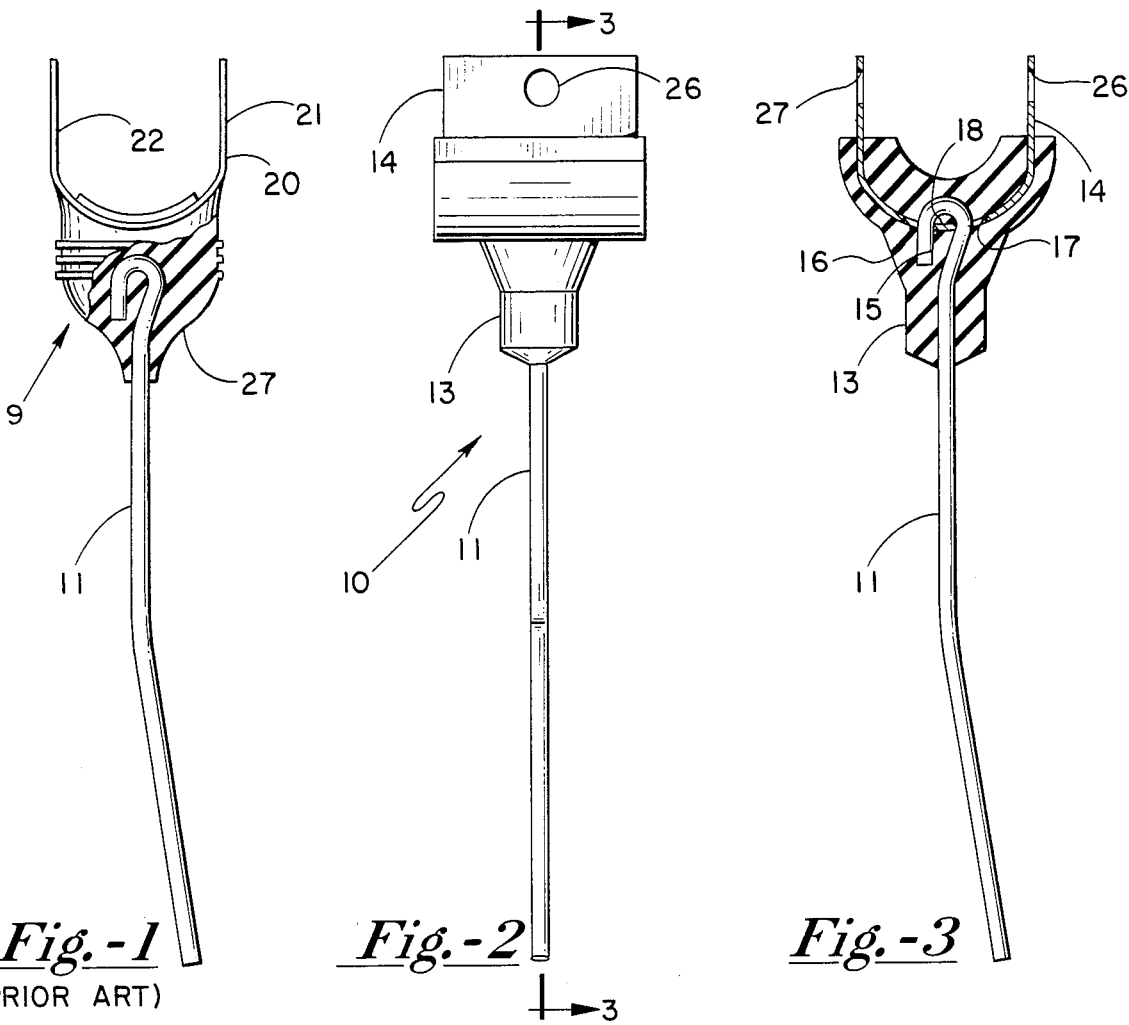
Fig.-1 (PRIOR ART)
Fig.-2
Fig.-3
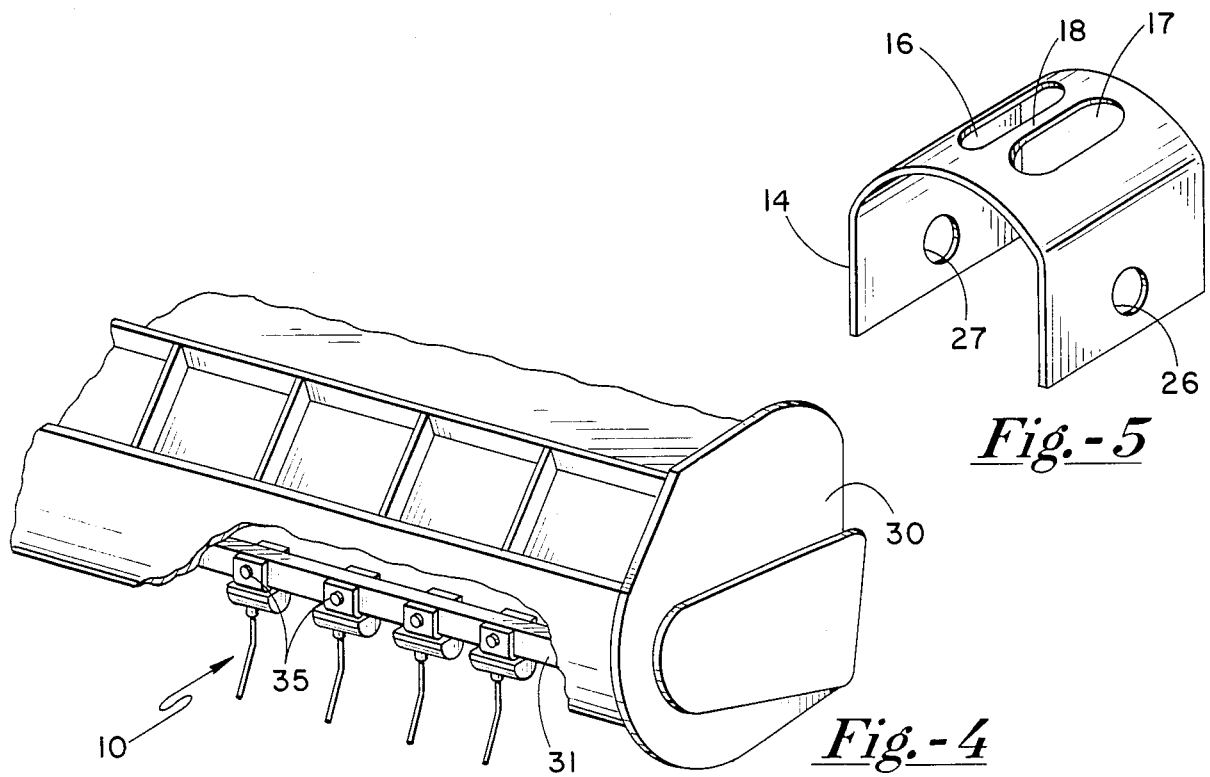
Fig.-5
Fig.-4

4,745,736

IMPLEMENT TINES

FIELD OF THE INVENTION

This invention relates generally to agriculture equipment and, more specifically, to improvements to tines for agricultural equipment.

BACKGROUND OF THE INVENTION

The concept of spring teeth or tines for use in agricultural implements is old in the art. Typically, tines have been used on such equipment as pea pickers, hay rakes and other apparatus which are used to lift forage or other hay or vine-like material off the ground. Generally the tines comprise an elongated cylindrical metal rod with some type of resiliency incorporated into the tine by a coil spring or a flexible support to permit the tines to flex instead of breaking in the event the tines engage a rock or the like. In a typical pea harvester, a plurality of tines are connected to an implement cross bar which is mounted to rotary support wheels with the rotary wheels connected by a plurality of spaced crossbars. The crossbars rotate in unison to permit the tines to engage and pick up material laying on or just above the ground. In a typical pea harvester there are about 13 crossbars that extend across and form the pea picking head of the harvester. Typically 420-760 tines per harvester engage the pea vines and pull the vines into the pea shelling portion of the pea harvester. The prior art type of tine is shown in partial cross-section in FIG. 1 and in general is shown to comprise a metal tooth or pin which is mounted to a U-shaped bracket with a rubber shock mount. The U-shaped metal bracket is mounted to the implement crossbars. It was this type of prior art device which has been found to break rather readily as the shock mount ages or if the tine hits a field obstruction. In addition, it has been found that even though the shock mount may not break the tine, the continual repeated forces on the tine may cause the tine to wear an opening in the mount to permit the tine to rotate thus rendering the tine ineffective. With the large number of tines required in each harvester, the replacement of tines can be both costly and a time-consuming nuisance.

BRIEF SUMMARY OF THE INVENTION

Briefly, the invention comprises an improvement to implement tines in which the tooth is pivotally connected to a metal support bracket and the pivotal junction between the tooth and the support bracket is encapsulated with a shock-aborsbing material such as rubber so that there is both a mechanical and flexible connection between the tooth and the support bracket to provide a flexible implement tine that can be used over an extended period of time.

BRIEF DESCRIPTION OF THE DRAWINGS

FIG. 1 is a partial cross-section view of a prior art tine;

FIG. 2 is a top view of the present invention;

FIG. 3 is a cross-sectional view of the present invention;

FIG. 4 is a partial front view of a pea picking head in a pea harvester showing a plurality of tines located on a crossbar; and FIG. 5 is a pictorial view of the support bracket.

DESCRIPTION OF THE PREFERRED EMBODIMENT

FIG. 1 shows a prior art tine 9 having a tooth 11, a support bracket 20 with holes 21 and 22 to mount bracket 20 to an implement crossbar. The end of tooth is encased in a flexible rubber shock mount 27 that permits the tooth to flex or bend if the tine hits an obstruction. It is this type of prior art tine which has encountered frequent field failures.

Referring to FIG. 2, reference numeral 10 generally identifies my improved implement tine comprising a metal tooth 11 which extends into a rubber mount 13 which encapsulates a portion of a metal support bracket 14 and one end of tooth 11. FIG. 3 illustrates the mechanical connection of the present invention. One end of tooth 11 includes an open eye or hook 15 which extends through openings 16 and 17 to engage a web 18 extending therebetween. It should be pointed out the general shape of tooth 11 as shown in FIGS. 2 and 3 is virtually identical to the prior art tooth shown in FIG. 1. In addition, the method of fastening a prior art bracket and the bracket of the present invention to an implement cross bar are generally the same since the bracket of the prior art device 20 is similar in that it has openings 21 and 22 for fastening to an implement cross bar. However, the method of connection of my tooth 10 to the U-shaped bracket is significantly different in that my U-shaped bracket 16 (see FIG. 3 and FIG. 5) has openings 16 and 17 which form a flat metal web 18 therebetween. In operation I insert eye 15 through openings 16 and 17 and around web 18 to provide a mechanical link or connection between metal bracket 14 and metal tooth 11. The mechanical link of the tooth 11 to bracket 14 prevents the tooth from both rotating and being pulled loose. The opening of the eye 15 is generally less than the width of the web so that to assemble the tooth, one must tilt the tooth so the opening engages the flat portion of web 18. When tooth 11 is rotated into proper orientation, the mechanical connection provides resistance to tooth 11 pulling out or tooth 11 be pushed inward. The mechanical link between bracket 14 and tooth 11 is then encapsulated in a resilient mount 13 of resilient material such as rubber or the like to form a shock mount that results in a strong and durable tine.

It has been found the combination of the mechanical link with a flexible material or resilient material encapsulating a portion of the bracket 14 as well as a portion of tooth 11 provides a tine with the necessary field resiliency for longlife field operation. In addition, the mechanical link between bracket 14 and tooth 11 prevents the tooth from turning along its axis to prevent rotational loosening of tooth 11 in the resilient mount 13. Furthermore, the mechanical linkage virtually eliminates the prior art problems of tine failure due to shock mount breakage.

FIG. 4 shows a pea harvester head 30 in a partial cutaway view showing a crossbar 31 with a plurality of tines 10 mounted thereto by bolts 35.

In the preferred embodiment of my invention, I place an adhesive on the bracket and mold the shock mount of rubber directly around the junction and to the support bracket. In addition, since the openings 16 and 17 are larger than the hook end of tooth 11, the rubber flows through the openings in the bracket to form an integral cushion support to tooth 11.

I claim:

1. An implement tine for attachment to an implement crossbar comprising:
   a bracket for mounting to an implement crossbar, said bracket having a web therein for engaging a hook on an implement tooth;
   said implement tooth having said hook located on one end of said tooth, said hook extending around said web in said bracket to provide a mechanical connection between said bracket and said tooth, said mechanical connection permitting lateral pivotal motion of said tooth; and
   a resilient mount encompassing the mechanical connection of said tooth with said bracket, said resilient mount providing lateral resiliency if said implement tooth is laterally deflected by an obstruction to provide a resilient implement tine for attachment to said implement crossbar that is resiliently deflected and returned to its original position regardless of the direction of lateral deflection of said implement tooth.

2. The implement tine of claim 1 wherein said resilient mount comprises rubber.

3. The implement tine of claim 2 wherein said bracket has a plurality of openings to permit the hook of said tooth to extend partially through said bracket.

4. The implement tine of claim 3 wherein said resilient mount encapsulates at least a portion of said bracket.

5. The implement tine of claim 4 wherein said web has sufficient width to prevent said hook end of said tooth from being forced out of said bracket.

6. The implement tine of claim 5 wherein said resilient mount extends through the openings in said bracket to integrally engage said bracket.

7. The implement tine of claim 6 including an adhesive for securing said resilient mount to said bracket.

* * * * *